(12) United States Patent
Yang et al.

(10) Patent No.: US 11,842,581 B2
(45) Date of Patent: Dec. 12, 2023

(54) REMOTE AUTOMOBILE DIAGNOSTIC METHOD, APPARATUS, AND SYSTEM

(71) Applicant: AUTEL INTELLIGENT TECHNOLOGY CORP., LTD., Guangdong (CN)

(72) Inventors: Yuexi Yang, Guangdong (CN); Chaochao Yu, Beijing (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 767 days.

(21) Appl. No.: 16/929,393

(22) Filed: Jul. 15, 2020

(65) Prior Publication Data
US 2020/0351110 A1 Nov. 5, 2020

Related U.S. Application Data

(63) Continuation of application No. PCT/CN2019/079519, filed on Mar. 25, 2019.

(30) Foreign Application Priority Data

Apr. 9, 2018 (CN) .......................... 201810309529.X (51) Int. Cl.
*G07C 5/08* (2006.01)
*H04L 12/18* (2006.01)

(52) U.S. Cl.
CPC ........ *G07C 5/0808* (2013.01); *H04L 12/1822* (2013.01)

(58) Field of Classification Search
CPC ... G07C 5/0808; G07C 5/008; H04L 12/1822; H04L 12/1813; H04N 7/155; H04N 7/15
See application file for complete search history.

(56) References Cited

U.S. PATENT DOCUMENTS

2008/0183484 A1  7/2008  Kondo et al.
2018/0162301 A1*  6/2018  Meng ..................... G01S 19/13

FOREIGN PATENT DOCUMENTS

| CN | 102183945 A | 9/2011 |
| CN | 102968112 A | 3/2013 |
| CN | 104038546 A | 9/2014 |

(Continued)

OTHER PUBLICATIONS

The First Chinese Office Action dated Apr. 23, 2019; Appln. No. 201810309529.X.

(Continued)

*Primary Examiner* — Michael V Kerrigan (57) ABSTRACT

The present invention provides a remote automobile diagnostic method, apparatus, and system. The method includes: receiving a diagnosis joining request sent by a remote terminal, and adding the remote terminal to a diagnostician group; sending, to a remote terminal in the diagnostician group, diagnostic information uploaded by a diagnostic device; and determining, as a control terminal, the remote control with control permission in the diagnostician group, so that the control terminal controls, according to the diagnostic information, the diagnostic device to perform an automobile diagnosis operation. Accordingly, a plurality of remote terminals can collaboratively diagnose an automobile, so that diagnosis efficiency of an automobile is improved.

19 Claims, 4 Drawing Sheets

(56) References Cited

FOREIGN PATENT DOCUMENTS

| | | | |
|---|---|---|---|
| CN | 107508849 A | 12/2017 |
| CN | 108449196 A | 8/2018 |
| CN | 109189041 A | 1/2019 |

OTHER PUBLICATIONS

The International Search Report dated Jun. 26, 2019; PCT/CN2019/079519.

* cited by examiner

REMOTE AUTOMOBILE DIAGNOSTIC METHOD, APPARATUS, AND SYSTEM

This application is a continuation application of International Application No. PCT/CN2019/079519, filed on Mar. 25, 2019, which claims priority of Chinese Patent Application No. 201810309529.X, filed on Apr. 9, 2018, which is incorporated herein by reference in its entirety.

BACKGROUND

Technical Field

This application relates to the technical field of vehicle diagnosis, and in particular, to a remote automobile diagnostic method, apparatus, and system.

Related Art

With the development of network technologies, a remote control technology is applied to the field of vehicle diagnosis. A diagnostician may control an automobile diagnostic device at site through a remote terminal, to remotely diagnose on a trouble of an automobile.

In the prior art, the remote terminal first establishes communication with the automobile diagnostic device through a network, and then transmits, through the network, information about an operation performed by the remote terminal on the automobile diagnostic device. For example, a diagnosis process of the automobile diagnostic device may be controlled through remote control of a human-computer interaction interface of the automobile diagnostic device.

However, this way is generally limited to one-to-one diagnosis, that is, one remote terminal controls one automobile diagnostic device for trouble diagnosis at site. In case of a plurality of trouble problems of different fields, a plurality of remote diagnosticians are usually required to perform diagnosis in turn. A diagnosis process is tedious, much diagnosis is repeated, and diagnosis efficiency is low.

SUMMARY

The present invention provides a remote automobile diagnostic method, apparatus, and system, so that a plurality of remote terminals collaboratively diagnose an automobile, thereby improving diagnosis efficiency of an automobile.

According to a first aspect, an embodiment of the present invention provides a remote automobile diagnostic method, including:
  receiving a diagnosis joining request sent by a remote terminal, and adding the remote terminal to a diagnostician group;
  sending, to the remote terminal in the diagnostician group, diagnostic information uploaded by a diagnostic device; and
  determining, as a control terminal, a remote terminal with control permission in the diagnostician group, so that the control terminal controls, according to the diagnostic information, the diagnostic device to perform an automobile diagnosis operation.

Optionally, before the receiving a diagnosis joining request sent by a remote terminal, the method further includes:
  initiating a diagnosis invitation to at least one remote terminal.

Optionally, after the sending, to the remote terminal in the diagnostician group, diagnostic information uploaded by a diagnostic device, the method further includes:
  receiving a diagnostic information adjustment request sent by the remote terminal;
  adjusting the diagnostic information associated with the remote terminal according to the diagnostic information adjustment request; and
  sending adjusted diagnostic information to the remote terminal.

Optionally, the diagnostic information adjustment request is used to request to adjust at least one piece of information in the diagnostic information;
  the adjusting the diagnostic information associated with the remote terminal according to the diagnostic information adjustment request includes:
  adjusting the at least one piece of information in the diagnostic information associated with the remote terminal according to the diagnostic information adjustment request.

Optionally, the determining, as a control terminal, the remote control with control permission in the diagnostician group includes:
  receiving a control request sent by the remote terminal in the diagnostician group, and determining at least one remote terminal to have the control permission according to a sequence of receiving the control request; or
  selecting at least one remote terminal to have the control permission from remote terminals in the diagnostician group that meet a preset condition.

Optionally, after a diagnostician group is established for all joined remote terminals, the method further includes:
  receiving a quit request sent by the remote terminal in the diagnostician group; and
  if it is determined that the remote terminal does not have the control permission, feeding quit agreement information back to the remote terminal, and deleting the remote terminal from the diagnostician group; or
  if it is determined that the remote terminal has the control permission, revoking the control permission of the remote terminal, feeding the quit agreement information back to the remote terminal, and deleting the remote terminal from the diagnostician group.

Optionally, the method further includes:
  receiving a sharing request of the remote terminal in the diagnostician group, and sharing a display interface of the remote terminal that sends the sharing request with other remote terminals in the diagnostician group in real time.

Optionally, the method further includes:
  receiving an invitation request of the remote terminal in the diagnostician group, the invitation request including information about a target remote terminal, and the target remote terminal referring to a remote terminal that is invited but not within the diagnostician group;
  forwarding the invitation request to the target remote terminal; and
  after an agreement message of the target remote terminal is received, adding the target remote terminal to the diagnostician group.

According to a second aspect, an embodiment of the present invention provides a remote automobile diagnostic method applied to a remote terminal, including:
  sending a diagnosis joining request to a server, so that the server adds the remote terminal to a diagnostician group;

receiving diagnostic information sent by the server, where the diagnostic information is uploaded by a diagnostic device;

if the server determines the remote terminal as a remote control with control permission using the remote terminal as a control terminal, and controlling, according to the diagnostic information, the diagnostic device to perform an automobile diagnosis operation.

According to a third aspect, an embodiment of the present invention provides a remote automobile diagnostic method applied to a diagnostic device, including:

sending diagnostic information to a server, so that the server sends the diagnostic information to a remote terminal in a diagnostician group; and performing an automobile diagnosis operation under control of a remote terminal with control permission in the diagnostician group.

According to a fourth aspect, an embodiment of the present invention provides a remote automobile diagnosis apparatus, including:

a processing module configured to: receive a diagnosis joining request sent by a remote terminal, and add the remote terminal to a diagnostician group;

a sending module configured to send, to the remote terminal in the diagnostician group, diagnostic information uploaded by a diagnostic device; and a determining module configured to determine, as a control terminal, a remote terminal with control permission in the diagnostician group, so that the control terminal controls, according to the diagnostic information, the diagnostic device to perform an automobile diagnosis operation.

Optionally, the sending module is further configured to initiate a diagnosis invitation to at least one remote terminal before a diagnosis joining request sent by the remote terminal is received.

Optionally, the processing module is further configured to, after diagnostic information uploaded by a diagnostic device is sent to the remote terminal in the diagnostician group, receive a diagnostic information adjustment request sent by the remote terminal, and adjust diagnostic information associated with the remote terminal according to the diagnostic information adjustment request; and the sending module is further configured to send adjusted diagnostic information to the remote terminal.

Optionally, the diagnostic information adjustment request is used to request to adjust at least one piece of information in the diagnostic information;

the adjusting the diagnostic information associated with the remote terminal according to the diagnostic information adjustment request includes:

adjusting the at least one piece of information in the diagnostic information associated with the remote terminal according to the diagnostic information adjustment request.

Optionally, the determining module is specifically configured to:

receive a control request sent by the remote terminal in the diagnostician group, and determine at least one remote terminal to have the control permission according to a sequence of receiving the control request; or select at least one remote terminal to have the control permission from remote terminals in the diagnostician group that meet a preset condition.

Optionally, the processing module is further configured to: receive a quit request sent by the remote terminal in the diagnostician group after a diagnostician group is established for all joined remote terminals;

if it is determined that the remote terminal does not have the control permission, feed quit agreement information back to the remote terminal, and delete the remote terminal from the diagnostician group; or if it is determined that the remote terminal has the control permission, revoke the control permission of the remote terminal, feed the quit agreement information back to the remote terminal, and delete the remote terminal from the diagnostician group.

Optionally, the processing module is further configured to:

receive a sharing request of the remote terminal in the diagnostician group, and share a display interface of the remote terminal that sends the sharing request with other remote terminals in the diagnostician group in real time.

Optionally, the processing module is further configured to:

receiving an invitation request of the remote terminal in the diagnostician group, the invitation request including information about a target remote terminal, and the target remote terminal referring to a remote terminal that is invited but not within the diagnostician group;

forward the invitation request to the target remote terminal; and after an agreement message of the target remote terminal is received, add the target remote terminal to the diagnostician group.

According to a fifth aspect, an embodiment of the present invention provides a remote automobile diagnostic system, including: a server, a remote terminal, and a diagnostic device;

the server being respectively connected to the remote terminal and the diagnostic device;

the server being configured to perform the remote automobile diagnostic method according to any of the first aspect;

the remote terminal being configured to perform the remote automobile diagnostic method according to the second aspect; and the diagnostic device being configured to perform the remote automobile diagnostic method according to the third aspect.

According to a six aspect, an embodiment of the present invention provides a server, including:

a memory configured to store a program;

a processor configured to execute the program stored in the memory, when the program is executed, the processor being configured to perform the method according to any of the first aspect.

According to a seventh aspect, an embodiment of the present invention provides a remote terminal, including:

a memory configured to store a program;

a processor configured to execute the program stored in the memory, when the program is executed, the processor being configured to perform the method according to any of the second aspect.

According to an eighth aspect, an embodiment of the present invention provides a diagnostic device, including:

a memory configured to store a program;

a processor configured to execute the program stored in the memory, when the program is executed, the processor being configured to perform the method according to any of the third aspect.

According to a ninth aspect, an embodiment of the present invention provides a computer readable storage medium, including an instruction. When the instruction is run on a computer, the computer performs the method according to any of the first aspect, the second aspect, and the third aspect.

According to the remote automobile diagnostic method, apparatus, and system provided in the embodiments of the present invention, the diagnosis joining request sent by the remote terminal is received, and the remote terminal is added to the diagnostician group; the diagnostic information uploaded by the diagnostic device is sent to the remote terminal in the diagnostician group; and the remote control with the control permission in the diagnostician group is determined as the control terminal, so that the control terminal controls, according to the diagnostic information, the diagnostic device to perform the automobile diagnosis operation. The plurality of remote terminals in the embodiments of the present invention may share the diagnostic information of the diagnostic device on line, so that the diagnostician can know diagnostic conditions at site in time, and the plurality of remote terminals can collaboratively diagnose an automobile. The remote terminal is adapted for diagnosis of a difficult trouble, and is quite efficient in diagnosis.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative effects shall fall within the protection scope of the present disclosure.

The terms "first", "second", "third", "fourth", and the like (if exists) in the specification and the claims of the present disclosure and the foregoing accompanying drawings are used for distinguishing similar objects, and do not need to be used for describing a particular sequence or order. It should be understood that data used in this way is interchangeable in a suitable case, so that the embodiments of the present disclosure described herein can be implemented in a sequence in addition to the sequence shown or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The following describes technical solutions of the present invention in detail with reference to specific embodiments. The following specific embodiments may be mutually combined, and same or similar concepts or processes may not be repeatedly described in some embodiments.

Some terms in this application are explained as follows for understanding by those skilled in the art:

1) On-board diagnostic (OBD) system: an on-board diagnostic II (OBD II) system configured to: determine, through monitoring, whether a working status of each system in a vehicle is abnormal, and if yes, determine a specific trouble in a corresponding system, and store the trouble in a form of diagnostic trouble codes (DTC). The system may perform self-diagnosis according to the DTC, so that the vehicle is repaired or maintained in time. The OBD may also be provided with an OBD interface. The OBD interface may be communicatively connected to an external vehicle diagnostic device, so that maintenance personnel can read the DTC in time using the device, and repair and maintenance the vehicle, thereby reducing a time for artificial diagnosis.

2) Electronic control unit (ECU): arranged in each system, for example, an engine system, an emission control system, and a fuel system, etc. of a vehicle, and may communicate with a diagnostic device through an OBD interface. The OBD interface may include a plurality of pins, and the ECU in each system may be connected to at least one pin in the OBD interface through a bus. Bus protocols used for connecting the systems to corresponding pins may be same or different, which is not limited herein.

3) Microcontroller unit (MCU): also referred to as a single chip microcomputer or a single chip computer, which is a chip-level computer formed through properly reduction of a frequency and specification of a central process unit (CPU) and integration of peripheral interfaces such as a memory, a timer, a universal serial bus (USB), and an A/D converter and even a drive circuit on a single chip. The microcontroller unit performs control of different combinations in different application scenarios, and may be used for control of a mobile phone, a peripheral product of a personal computer (PC), a remote control, an automotive electronic product, an industrial step motor, and a mechanical arm, etc.

4) Vehicle connection interface (VCI): configured to connect an OBD interface to an external terminal. The terminal may include a computer. In the present invention, the OBD interface is electrically connected to a diagnostic PC (a diagnostic device) through the VCI. Diagnostic software runs in the diagnostic PC, and signals collected by different pins of the OBD interface are analyzed and processed through a micro control unit (MCU).

Figure 1:
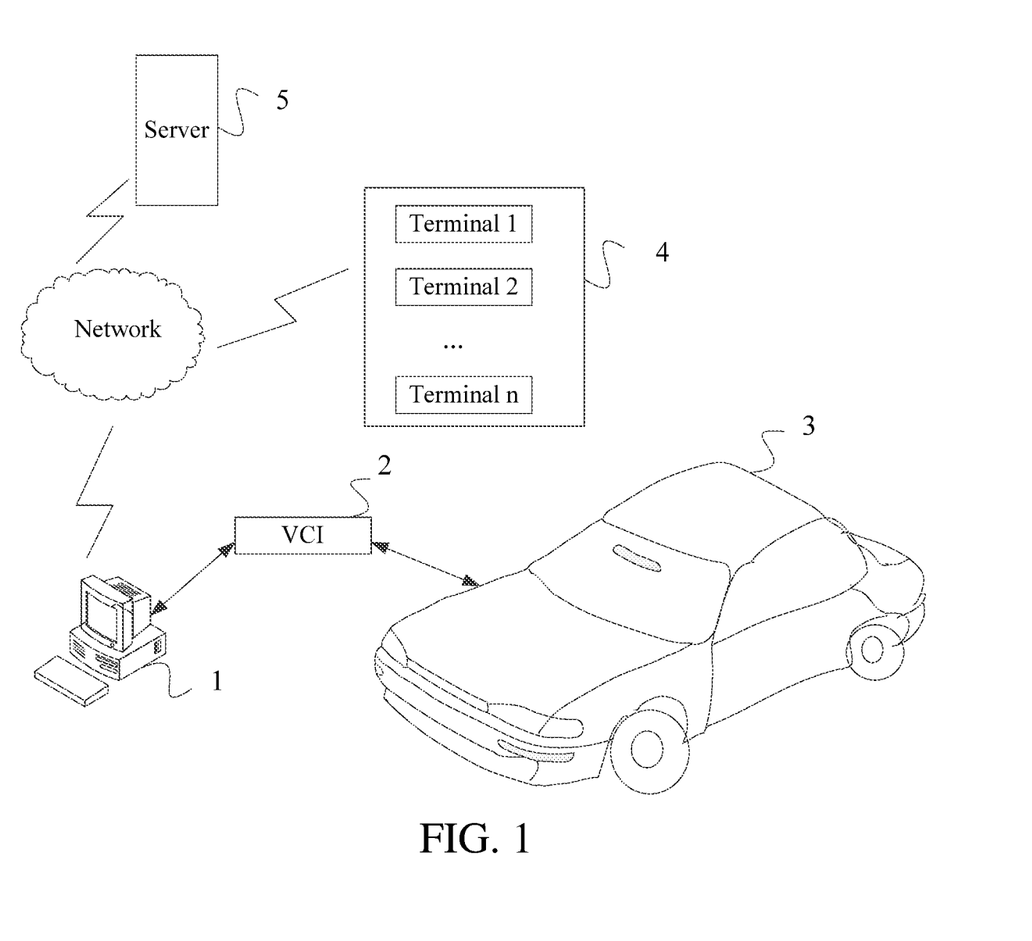
FIG. 1 is a schematic diagram of an application scenario according to the present invention.

An application scenario in an embodiment of this application is illustrated below with reference to FIG. 1. FIG. 1 is a schematic diagram of an application scenario according to the present invention. As shown in FIG. 1, in the application scenario, a diagnostic device 1, a VCI 2, a to-be-repaired vehicle 3, a remote terminal 4, and a server 5 are included. The diagnostic device 1 is electrically connected to an interface of an on-board diagnostic system of the to-be-repaired vehicle 3 through the VCI 2. The diagnostic device 1 is provided with diagnostic software, and has input/output apparatuses such as a human-computer interaction interface, a built-in camera, and a recording apparatus, etc. After the diagnostic device 1 establishes communication with an electronic control unit (ECU) of each system within the automobile through VCI 2, diagnostic software is run to implement automatic diagnosis of the to-be-repaired vehicle 3. During diagnosis, an operating interface of the current diagnostic device and an on-site maintenance video of the automobile may be displayed in split screens on the human-computer interaction interface of the diagnostic device 1, and a feedback sound of the automobile and an explanation voice of the diagnostic personnel during the diagnosis are recorded through a recording apparatus. The diagnostic device 1 then sends the human-computer interaction interface of the diagnostic device 1 and the feedback sound of the automobile and the explanation voice of the diagnostic personnel during the diagnosis to a server 5 through a network. The remote terminal 4 may be a plurality of terminals, and the plurality of terminals are communicatively connected to the server 5 to join a diagnosis meeting for to-be-repaired vehicle 3, and receive and display the human-computer interaction interface of the diagnostic device 1 sent by the server 5, and synchronously play one or more pieces of information such as the feedback sound of the automobile or the explanation voice of the diagnostic personnel during the diagnosis. A terminal with control permission in the remote terminals 4 may be remotely connected to the diagnostic device 1 through the network, and may control the human-computer interaction interface of the diagnostic device 1 in a same screen. If text editing is required during diagnosis, the terminal with the control permission may further directly add a text remark to the human-computer interaction interface of the diagnostic device.

Figure 2:
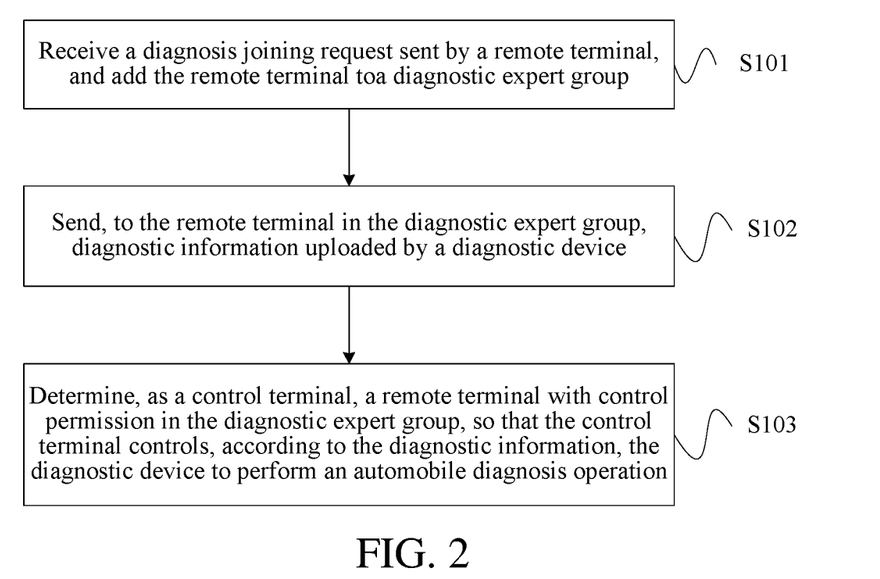
FIG. 2 is a flowchart of a remote automobile diagnostic method according to Embodiment 1 of the present invention.

FIG. 2 is a flowchart of a remote automobile diagnostic method according to Embodiment 1 of the present invention. As shown in FIG. 2, the method in this embodiment may include the following steps.

S101: A diagnosis joining request sent by a remote terminal is received, and the remote terminal is added to a diagnostician group.

In this embodiment, referring to the application scenario in FIG. 1, first, a diagnostic device establishes communication with an electronic control unit (ECU) of each system within the automobile through VCI. In this case, a human-computer interaction interface of the diagnostic device displays a diagnostic operating interface. A camera and a recording apparatus of the diagnostic device are turned on (it should be noted that the diagnostic device may be equipped with the camera and the recording apparatus, or may be electrically connected to an external camera and recording apparatus). The camera is configured to record a video of on-site automobile diagnosis, and the recording apparatus is configured to record an automobile sound and/or an explanation voice of diagnostic personnel. The diagnostic device then uploads diagnostic information to a server. The diagnostic information includes: diagnostic operation interface information of the diagnostic device, video recording information of on-site automobile diagnosis, automobile sound information and/or explanation voice information of the diagnostic personnel that are synchronous with an on-site automobile diagnosis video. Finally, the server summarizes the received diagnostic information, to obtain a display interface including a diagnostic device operating interface, an on-site automobile diagnosis video recording interface (which may be a plurality of videos, and depends on a number of on-site cameras), and synchronously configure an automobile sound and/or an explanation voice of the diagnostic personnel that are synchronous with the on-site automobile diagnosis video for the display interface.

Definitely, the diagnosis joining request sent by the remote terminal may be further received in other application scenarios.

In this embodiment, the server receives the diagnosis joining request sent by the remote terminal. The remote terminal may be a device such as a computer and a smart phone, etc. The server gathers the remote terminals that apply for joining to establish a diagnostician group or a plurality of diagnostician groups. Alternatively, the server adds the remote terminals to one or more established diagnostician groups according to information about the remote terminals that apply for joining. Each diagnostician group may include one or more remote terminals.

In an implementation, each remote terminal is equivalent to one diagnostician. When only one diagnostician group is constructed, diagnosticians that are skilled in diagnosis of different types of troubles may be gathered in one diagnostician group. When a plurality of diagnostician groups are constructed, diagnosticians that are skilled in diagnosis of a same type of troubles are gathered in one diagnostician group, and a plurality of diagnostician groups are added to one diagnosis meeting. In this embodiment, constitutions and a number of the diagnostician groups are not limited.

Definitely, one or more diagnostician groups may be further established according to other properties of the remote terminals. For example, the server may establish different diagnostician groups according to different on-site diagnostic information required for the remote terminals. For example, some remote terminals request for display information of the human-computer interaction interface, etc. of the diagnostic device, and other remote terminals request for one or more pieces of on-site sound information, etc. of the diagnostic device. Therefore, one diagnostician group may be established for remote terminals that request for same information. Alternatively, the server may establish different diagnostician groups according to different networks for connecting the remote terminals to the server.

Optionally, the server may also initiate a diagnosis invitation to at least one remote terminal before the diagnosis joining request sent by the remote terminal is received. For example, the server may pre-store information about a diagnostician. When there is a difficult diagnostic problem, a diagnosis invitation may be sent to a diagnostician skilled diagnosis of the problem, that is, a remote terminal corresponding to the diagnostician sends the diagnosis invitation. It should be noted that the server may send an invitation to the remote terminal or receive the diagnosis joining request of the remote terminal before or after the diagnostician group is established. The diagnostician group may dynamically changes, or may include fixed remote terminals.

Optionally, after a diagnostician group is established for all joined remote terminals, the method further includes:
receiving a quit request sent by the remote terminal in the diagnostician group; and
if it is determined that the remote terminal does not have the control permission, feeding quit agreement information back to the remote terminal, and deleting the remote terminal from the diagnostician group; or if it is determined that the remote terminal has the control permission, revoking the control permission of the remote terminal, feeding the quit agreement information back to the remote terminal, and deleting the remote terminal from the diagnostician group.

In this embodiment, the server receives a quit request sent by the remote terminal in the diagnostician group, the quit request being used to request to quit from the diagnostician group. When the remote terminal that sends the quit request does not have the control permission, the server checks the quit request, and then feeds the quit agreement information back to the remote terminal upon check approval, and deletes the remote terminal from the diagnostician group. When the remote terminal that sends the quit request has the control permission, the remote terminal may actively abandon the control permission, or the server sends control permission revoking information, so that the control permission of the remote terminal is revoked by the server. Finally, the server feeds the quit agreement information back to the remote terminal and deletes the remote terminal from the diagnostician group.

Optionally, the server re-determines a control terminal in the diagnostician group after revoking the control permission of the remote terminal. For example, the server may accept a recommendation from the remote terminal that originally has the control permission, and releases the control permission to a recommended remote terminal.

Optionally, the server may also announce the control permission in the diagnostician group. The server receives control requests sent by remote terminals in the diagnostician group, and releases the control permission to a remote terminal that first submits the control request, or randomly releases the control permission to a remote terminal that in the diagnostician group that meets to a preset condition.

S102; Diagnostic information uploaded by a diagnostic device is sent to the remote terminal in the diagnostician group.

In this embodiment, the server sends, to one or more remote terminals in the diagnostician group, the diagnostic information uploaded by the diagnostic device. For example, the diagnostic information may include at least one of the following information: a diagnostic device operating interface, a display interface of an on-site automobile diagnosis video recording interface (which may be a plurality of videos, and depends on a number of on-site cameras), and synchronous displaying of an automobile sound and/or an explanation voice of diagnostic personnel, etc. that are synchronous with an on-site automobile diagnosis video.

In an example, the server may send same diagnostic information to all remote terminals in one diagnostician group, or sends different diagnostic information to different remote terminals in the diagnostician group. For example, the server may send, to a remote terminal in the diagnostician group, diagnostic information requested by the remote terminal.

Optionally, after the diagnostic information uploaded by the diagnostic device is sent to all the remote terminals in the diagnostician group, the server may further receive a diagnostic information adjustment request sent by the remote terminal;

adjust the diagnostic information associated with the remote terminal according to the diagnostic information adjustment request; and send adjusted diagnostic information to the remote terminal.

For example, the server may adjust the at least one piece of information in the diagnostic information associated with the remote terminal according to the diagnostic information adjustment request. The diagnostic information associated with the remote terminal refers to diagnostic information required for the remote terminal or diagnostic information output by the remote terminal, for example, displaying of the diagnostic information or voice playing of the diagnostic information, etc. Adjusting the diagnostic information associated with the remote terminal means to increase or decrease an amount of the diagnostic information associated with the remote terminal. For example, the diagnostic information associated with the remote terminal includes a human-computer interaction interface. After the remote diagnostic information adjustment request is received, an on-site voice information, such as an explanation voice or a sound of an on-site vehicle, may be sent to the remote terminal, so that the diagnostic information associated with the remote terminal is adjusted to information including the human-computer interaction interface and the on-site voice information, that is, the amount of the diagnostic information associated with the remote terminal is increased. Similarly, the amount of the diagnostic information associated with the remote terminal may also be decreased.

Alternatively, a manner of transmitting the diagnostic information associated with the remote terminal is adjusted. For example, since a network connection between the remote terminal and the server is unstable, in order to prevent data loss during transmission, the remote terminal sends a diagnostic information adjustment request to the server when monitoring that the current network connection is unstable or in congestion, so that the server reduces a rate or a code rate, etc. at which the diagnostic information associated with the remote terminal according to the diagnostic information adjustment request.

Definitely, the server may further perform other adjustments after receiving the diagnostic information adjustment request, which is not limited herein.

Figure 4:
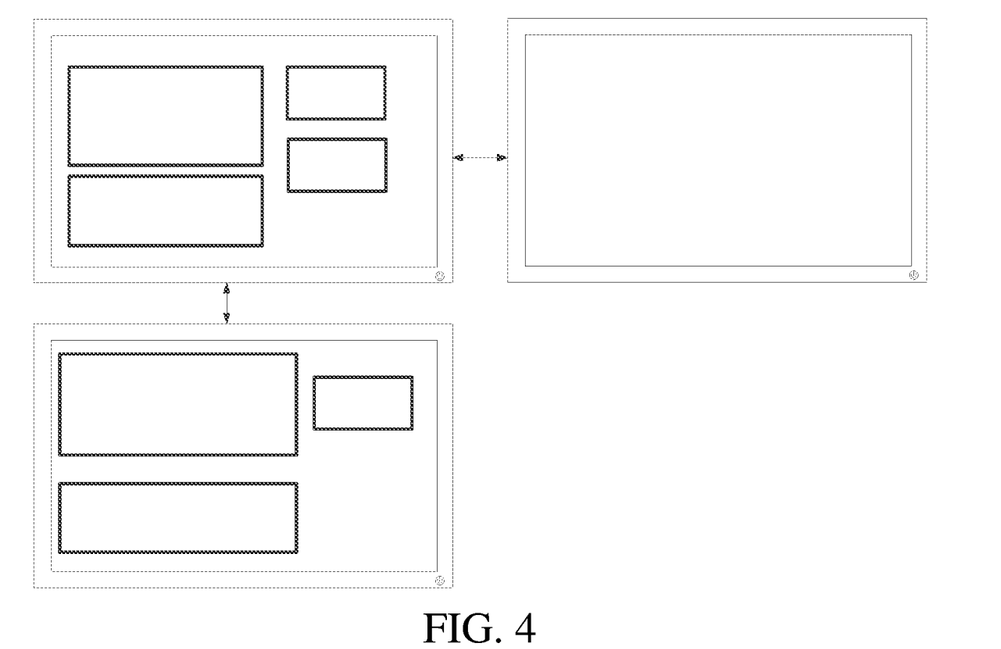
FIG. 4 is a schematic diagram of variations of a display interface of a remote terminal in a diagnostician group.

In an implementation, if the diagnostic information associated with a remote terminal includes displayed information, such as the human-computer interaction interface, all remote terminals in the diagnostician group may adjust current displayed diagnostic information according to operation information input by the diagnostician. In particular, the remote terminal may send the diagnostic information adjustment request to the server, and the server adjusts the diagnostic information currently displayed by the remote terminal, and sends adjusted diagnostic information to the respective remote terminal. FIG. 4 is a schematic diagram of variations of a display interface of a remote terminal in a diagnostician group. As shown in FIG. 4, in an initial state, the remote terminal displays all diagnostic information, all the information being displayed in one display area (a rectangular display area in the figure). In an intermediate state, any information may be zoomed in, zoomed out, dragged, or closed, etc. according to operation information input by a diagnostician.

In particular, the remote terminal including a display interface is used as an example for detailed description. The server may provide the remote terminal with all or a part of the diagnostic information according to demands of the remote terminal. In an implementation, when the remote terminal needs to adjust the display interface, the remote terminal first receives operation information input by a user, generates an adjustment instruction according to the adjustment information, and sends the adjustment instruction to the server, and the server adjusts diagnostic information currently displayed by the remote terminal. Finally, the server generates adjusted diagnostic information and sends the adjusted diagnostic information to the remote terminal. For example, when a plurality of display interfaces are displayed on a display screen of the remote terminal, the remote terminal may perform any of the following operations according to the operation information input by the user: displaying a diagnostic operating interface in a full screen, or displaying an on-site automobile diagnosis video recording interface in a full screen; when the diagnostic operating interface and the on-site automobile diagnosis video playing interface are displayed in a same screen, adjusting a display area of the diagnostic operating interface, the adjustment includes: dragging a position of the display area and zooming in or zooming out the display area; and when the diagnostic operating interface and the on-site automobile diagnosis video playing interface are displayed in the same screen, adjusting a display area of the on-site automobile diagnosis video recording interface, the adjustment including: dragging a position of the display area and zooming in or zooming out the display area. During sharing of the diagnostic information, a remote terminal may be freeze due to a network signal problem or cannot smoothly play a video. In this case, the remote terminal may send, to the server, an adjustment request such as a video definition adjustment request or a display interface reduction request, etc.

In another implementation, the remote terminal pre-acquires all diagnostic information from the server, and the diagnostic information is stored in a local memory of the remote terminal. In this case, the remote terminal may freely switch displayed diagnostic information without a need of sending the diagnostic information adjustment request to the server. For example, when a plurality of display interfaces are displayed on the display screen of the remote terminal, the remote terminal may perform any of the following operations according to the operation information input by the user: displaying a diagnostic operating interface in a full screen, or displaying an on-site automobile diagnosis video recording interface in a full screen; when the diagnostic operating interface and the on-site automobile diagnosis video playing interface are displayed in a same screen, adjusting a display area of the diagnostic operating interface, the adjustment including: dragging a position of the display area and zooming in or zooming out the display area; and when the diagnostic operating interface and the on-site automobile diagnosis video playing interface are displayed in the same screen, adjusting a display area of the on-site automobile diagnosis video recording interface, the adjustment including: dragging a position of a display area and zooming in or zooming out the display area.

S103: A remote terminal with control permission in the diagnostician group is determined as a control terminal, so that the control terminal controls, according to the diagnostic information, the diagnostic device to perform an automobile diagnosis operation.

In this embodiment, although the diagnostician group may include a plurality of remote terminals, not all remote terminals have the permission of remotely controlling the diagnostic device. A remote terminal without the control permission may participate in discussion of a diagnostic process, and provide a diagnostic suggestion, etc., but cannot remotely control the diagnostic device. Therefore, a remote terminal in the diagnostician group is required to be determined to have the control permission, and the remote terminal is used as a control terminal, so that the control terminal remotely controls, according to the diagnostic information, the diagnostic device to perform an automobile diagnosis operation.

Optionally, the control terminal may be determined in the following manner:

a control request sent by the remote terminal in the diagnostician group is received, and at least one remote terminal is determined to have the control permission according to a sequence of receiving the control request; or at least one remote terminal is selected to have the control permission from remote terminals in the diagnostician group that meet a preset condition.

In this embodiment, the remote terminal may request for the control permission, or a server side may select, as the control terminal, a remote terminal that meets a preset condition from the diagnostician group. The control terminal may establish communication with the diagnostic device through a network, so that the diagnostician can remotely control, through an operation in the control terminal, the diagnostic device to perform an automobile diagnosis operation.

After the control terminal in the diagnostician group is determined, the control terminal controls, according to operation information input by the diagnostician, the diagnostic device to run diagnostic software to acquire data in an ECU within the automobile, and perform diagnosis according to the acquired data, or send a diagnostic instruction, etc. to the ECU. Optionally, the method in the embodiment in FIG. 2 may further include: receiving a sharing request of the remote terminal in the diagnostician group, and sharing a display interface of the remote terminal with other remote terminals in the diagnostician group in real time.

In this embodiment, any remote terminal in the diagnostician group may upload a current display interface thereof to the server in real time, and sends the sharing request to the server. The server sends, to other remote terminals in the diagnostician group, the current display interface of the remote terminal that submits the sharing request. Other remote terminals may determine, according to a user instruction, whether to view a shared display interface. For example, other remote terminals may close the shared display interface, or view the shared display interface in split screens or in a same screen. It should be noted that a content shared by the remote terminal not only includes the current display screen, but also may include multimedia information such as words, pictures, and an explanation voice added by a diagnostician of the remote terminal. For a sharing process of such multimedia information, refer to the sharing process of the foregoing display interface, and details are not described herein again.

In this embodiment, the diagnosis joining request sent by the remote terminal is received, and the remote terminal is added to the diagnostician group; the diagnostic information uploaded by the diagnostic device is sent to the remote terminal in the diagnostician group; and the remote control with the control permission in the diagnostician group is determined as the control terminal, so that the control terminal controls, according to the diagnostic information, the diagnostic device to perform the automobile diagnosis operation. The plurality of remote terminals in the embodiments of the present invention may share the diagnostic information of the diagnostic device on line, so that the diagnostician can know diagnostic conditions at site in time, and the plurality of remote terminals can collaboratively diagnose an automobile. The remote terminal is adapted for diagnosis of a difficult trouble, and is quite efficient in diagnosis.

Figure 3:
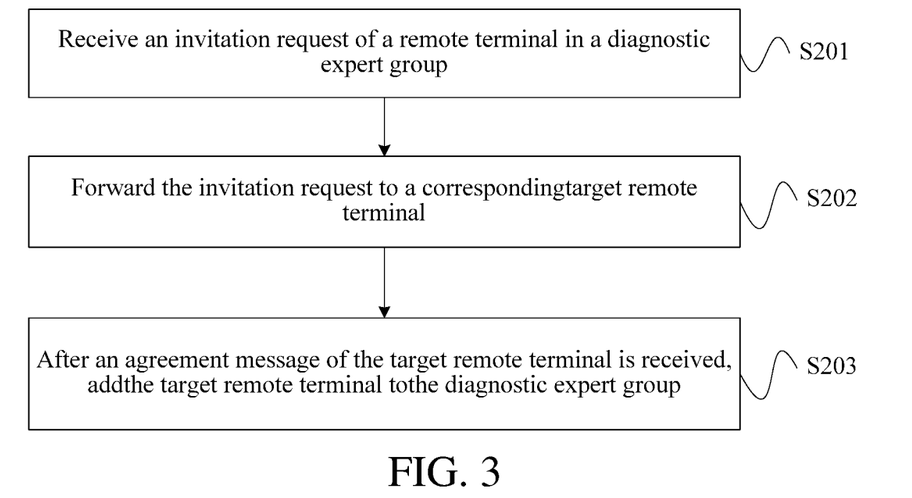
FIG. 3 is a flowchart of a remote automobile diagnostic method according to Embodiment 2 of the present invention.

FIG. 3 is a flowchart of a remote automobile diagnostic method according to Embodiment 2 of the present invention. As shown in FIG. 3, the method in this embodiment is based on the method shown in FIG. 2, and may include the following steps.

S201: An invitation request of a remote terminal in a diagnostician group is received.

In this embodiment, any remote terminal in the diagnostician group may send an invitation request to a server. The invitation request includes information of a target remote terminal, the target remote terminal referring to a remote terminal that is invited but not within the diagnostician group. For example, a remote terminal A wants a remote terminal B to join the diagnostician group. In this case, the remote terminal A may send an invitation request to the server, the invitation request including ID information or IP information of the remote terminal B.

S202: The invitation request is forwarded to a corresponding target remote terminal.

In this embodiment, the server forwards the invitation request to the target remote terminal. The example in step S201 is used as an example. The server finds the remote terminal B according to the ID information or the IP information of the remote terminal B included in the invitation request, and then sends an invitation request to the remote terminal B to ask the terminal B to join the diagnostician group.

S203. After an agreement message of the target remote terminal is received, the target remote terminal is added to the diagnostician group.

In this embodiment, the server adds the target remote terminal to the diagnostician group after receiving the agreement message of the target remote terminal. After joining the diagnostician group, the target remote terminal may receive resources shared in the server, for example, diagnostic information uploaded by a diagnostic device and a display interface shared by a remote terminal in the diagnostician group, etc.

Further, upon completion of the diagnosis, the remote terminal may record a diagnosis process as a diagnosis case, and stores the diagnosis case in a preset format. The preset format may be a format specified for a specifically developed target player, or a common video format such as MP4 or RMVB. In addition, audio/video information collected during diagnosis is compressed and integrated through an audio/video compression algorithm. Therefore, diagnostic files are reduced in size and number, to reduce storage space and traffic that are used, thereby facilitating storage and forwarding.

In this embodiment, the server receives an invitation request of a remote terminal in a diagnostician group, the invitation request containing information of a target remote terminal, forwards the invitation request to the respective remote terminal, and joins the target remote terminal in the diagnostician group after receiving the agreement message of the target remote terminal. Therefore, the remote terminal in the diagnostician group may send the invitation request to the target remote terminal that does not belong to the diagnostician group, so that a new diagnostician may be added at any moment during diagnosis, thereby more comprehensively providing professional guidance for on-site automobile diagnosis. Therefore, a diagnostic result is more accurate and difficulty in automobile diagnosis is reduced.

It should be noted that entire diagnosis processes in the technical solutions shown in FIG. 2 to FIG. 3 may be further shared through network broadcast. Therefore, the diagnosis processes may be applied to technical training, technical exhibition, technical guidance, and diagnostic industry meeting of automobile diagnosis.

Figure 5:
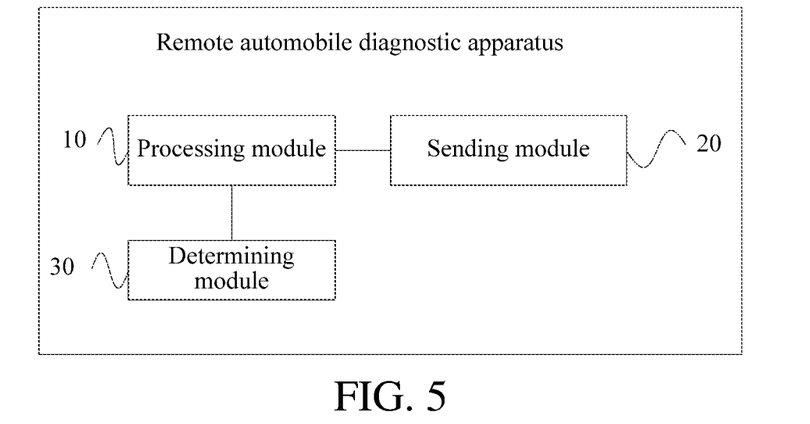
FIG. 5 is a schematic structural diagram of a remote automobile diagnosis apparatus according to Embodiment 3 of the present invention.
Figure 6:
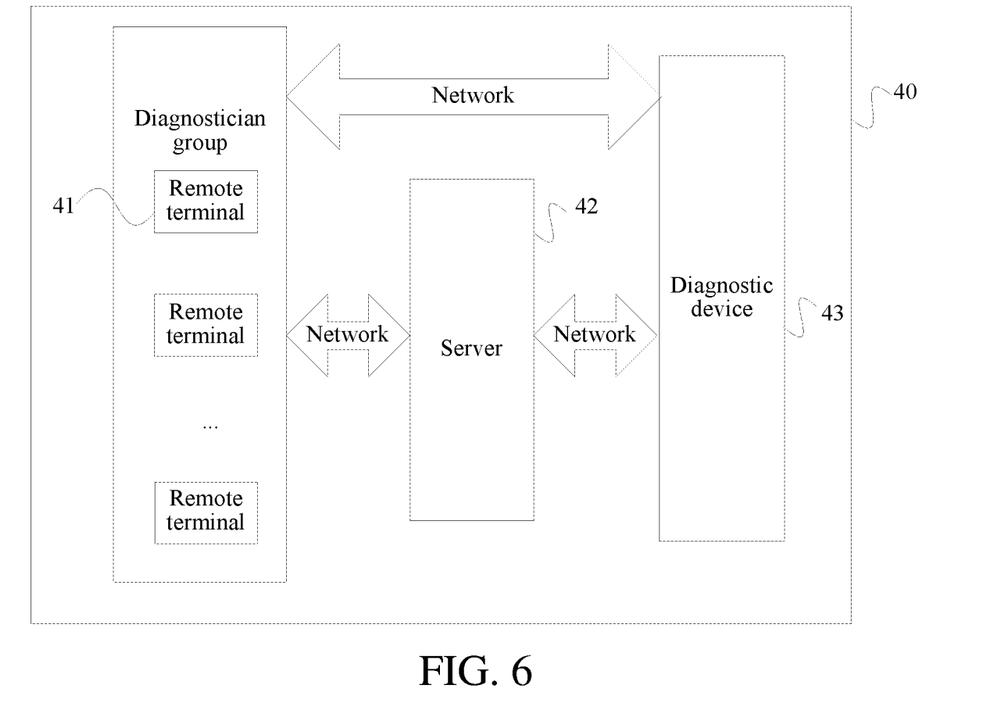
FIG. 6 is a schematic structural diagram of a remote automobile diagnostic apparatus according to Embodiment 4 of the present invention.

FIG. 5 is a schematic structural diagram of a remote automobile diagnostic apparatus according to Embodiment 3 of the present invention. As shown in FIG. 6, the apparatus in this embodiment may include:

a processing module 10 configured to: receive a diagnosis joining request sent by a remote terminal, and add the remote terminal to a diagnostician group;

a sending module 20 configured to send, to the remote terminal in the diagnostician group, diagnostic information uploaded by a diagnostic device; and a determining module 30 configured to determine, as a control terminal, a remote terminal with control permission in the diagnostician group, so that the control terminal controls, according to the diagnostic information, the diagnostic device to perform an automobile diagnosis operation.

Optionally, the sending module 20 is further configured to initiate a diagnosis invitation to at least one remote terminal before a diagnosis joining request sent by the remote terminal is received.

Optionally, the processing module 10 is further configured to: after diagnostic information uploaded by a diagnostic device is sent to the remote terminal in the diagnostician group, receive a diagnostic information adjustment request sent by the remote terminal, and adjust diagnostic information associated with the remote terminal according to the diagnostic information adjustment request; and the sending module 20 is further configured to send adjusted diagnostic information to the remote terminal.

Optionally, the diagnostic information adjustment request is used to request to adjust at least one piece of information in the diagnostic information;

the adjusting the diagnostic information associated with the remote terminal according to the diagnostic information adjustment request includes:

adjusting the at least one piece of information in the diagnostic information associated with the remote terminal according to the diagnostic information adjustment request.

Optionally, the determining module 30 is specifically configured to:

receive a control request sent by the remote terminal in the diagnostician group, and determine at least one remote terminal to have the control permission according to a sequence of receiving the control request; or select at least one remote terminal to have the control permission from remote terminals in the diagnostician group that meet a preset condition.

Optionally, the processing module 10 is further configured to receive a quit request sent by the remote terminal in the diagnostician group after the diagnostician group is established for all joined remote terminals;

if it is determined that the remote terminal does not have the control permission, feed quit agreement information back to the remote terminal, and delete the remote terminal from the diagnostician group; or if it is determined that the remote terminal has the control permission, revoke the control permission of the remote terminal, feed the quit agreement information back to the remote terminal, and delete the remote terminal from the diagnostician group.

Optionally, the processing module 10 is further configured to:

receive a sharing request of the remote terminal in the diagnostician group, and share a display interface of the remote terminal that sends the sharing request with other remote terminals in the diagnostician group in real time.

Optionally, the processing module 10 is further configured to:

receive an invitation request of the remote terminal in the diagnostician group, the invitation request including information about a target remote terminal, and the target remote terminal referring to a remote terminal that is invited but not within the diagnostician group;

forward the invitation request to the target remote terminal; and after an agreement message of the target remote terminal is received, add the target remote terminal to the diagnostician group.

In this embodiment, the foregoing technical solutions in the methods shown in the FIG. 2 and FIG. 3 may be performed. An implementation process and a technical effect thereof are similar to those of the foregoing method, and therefore details are not described herein again.

FIG. 6 is a schematic structural diagram of a remote automobile diagnosis system according to Embodiment 4 of the present invention. A system 40 in this embodiment may include: a remote terminal 41, a server 42, and a diagnostic device 43. The diagnostic device 43 is connected to the remote terminal 41 and the server 42 through a network, and is electrically connected to an on-board diagnostic (OBD) system of an automobile through a vehicle connection interface (VCI), so as to establish communication between the diagnostic device and an electronic control unit (ECU) within the automobile.

The server 42 is configured to perform the foregoing technical solutions in the methods shown in the FIG. 2 and FIG. 3.

The remote terminal 41 is configured to: send a diagnosis joining request to a server, so that the server adds the remote terminal to a diagnostician group; and receive diagnostic information sent by the server, the diagnostic information being uploaded by a diagnostic device. If the remote terminal is determined as a remote terminal with control permission by the server, the remote terminal is used as a control terminal, and controls, according to the diagnostic information, the diagnostic device to perform an automobile diagnosis operation.

The diagnostic device 43 is configured to: send diagnostic information to the server, so that the server sends the diagnostic information to a remote terminal in the diagnostician group, and perform an automobile diagnosis operation under control of a remote terminal with control permission in the diagnostician group. The diagnostic information includes: diagnostic operation interface information of the diagnostic device 43, on-site automobile diagnosis video recording information, and automobile sound information and/or explanation voice information of diagnostic personnel that are synchronous with an on-site automobile diagnosis video.

In this embodiment, the technical solutions in the methods shown in the foregoing FIG. 2 to FIG. 3 may be performed. An implementation process and a technical effect thereof are similar to those of the foregoing method, and therefore details are not described herein again.

It should be noted that if no camera is configured on the diagnostic device in this embodiment or a configured camera has a not high pixel, the diagnostic device may be connected to one or more external cameras through a USB interface of the diagnostic device. The diagnostic device may be further connected to an endoscope camera through the USB interface to facilitate observation of narrow space or a location where it is not convenient to capture video in the automobile. When the diagnostic device is connected to a plurality of external cameras, a plurality of on-site automobile diagnosis videos may be obtained from a plurality of angles. If no recording apparatus is configured on the diagnostic device, or a configured recording apparatus has a poor effect, the diagnostic device may be connected to one or more external recording apparatuses through the USB interface of the diagnostic device. For example, the diagnostic device may be connected to a microphone, and an on-site automobile sound and/or an on-site explanation voice of diagnostic personnel in on-site automobile diagnosis may be collected through the microphone.

Figure 7:
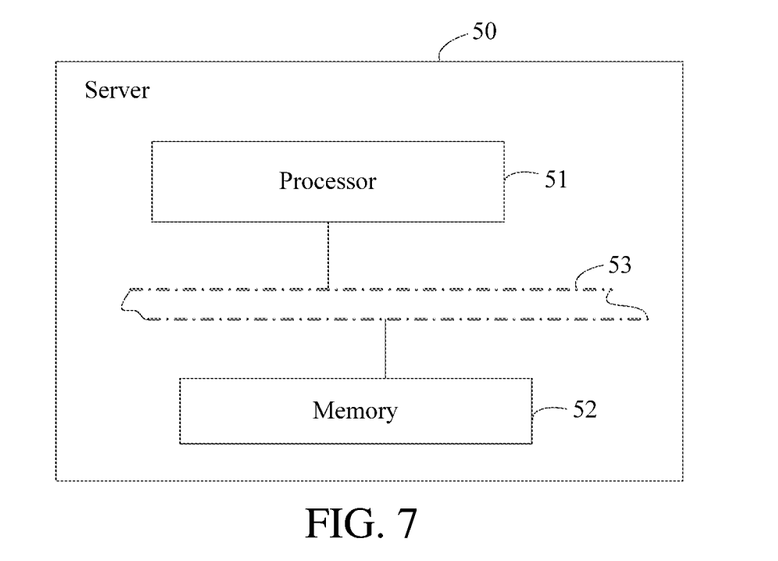
FIG. 7 is a schematic structural diagram of a server according to Embodiment 5 of the present invention.

FIG. 7 is a schematic structural diagram of a server according to Embodiment 5 of the present invention. As shown in FIG. 7, the device in this embodiment may include:

at least one processor 51 and at least one memory 52.

The memory 52 is configured to store an executable instruction, and the memory may also be a flash.

The processor 51 is configured to execute the executable instruction stored in the memory to implement the steps in the methods in the foregoing embodiments. For example, a computer or a smart phone (which is equivalent to a terminal) may establish communication with an unmanned aerial vehicle through a remote control. The terminal invokes and executes executable instructions (these instructions may be codes written in a programming language such as C, C++, Java, etc.) stored in an internal storage device of the terminal in a pre-configured software operating environment to perform the methods shown in FIG. 2 to FIG. 4. For details, refer to the related descriptions in the foregoing method embodiments.

Optionally, the memory 52 may be either independent or integrated with the processor 51.

When the memory 52 is a device independent of the processor 51, the server 50 may further include:

a bus 53 configured to connect the memory 52 and the processor 51.

The server 50 may further include a communication interface to implementation communication with a diagnostic device and a remote device. The communication interface may include a wired communication interface and a wireless communication interface, etc. The wired communication interface may communicate with the foregoing device using a wired technology or a wired network. The wireless communication interface may communicate with the foregoing device using a wireless technology or a wireless network. No limitation is imposed herein.

Definitely, the server may further include other general-purpose apparatuses, such as an antenna, and details are not described herein again.

In addition, an embodiment of this application further provides a computer readable storage medium that stores a computer executable instruction. When at least one processor of user equipment executes the computer executable instruction, the user equipment performs the foregoing various possible methods.

The computer readable medium includes a computer storage medium and a communication medium. The communication medium includes any medium that facilitates transfer of a computer program from one place to another. The storage medium may be any available medium that a general-purpose or special-purpose computer can access. An exemplary storage medium is coupled to a processor, so that the processor can read information from the storage medium and write information into the storage medium. Definitely, the storage medium may also be a part of the processor. Both the processor and the storage medium may be located in an application specific integrated circuit (ASIC). In addition, the ASIC may be located in the server. Definitely, both the processor and the storage medium may also exist in a communication device as discrete components.

A person of ordinary skill in the art may understand that all or some of the steps of the foregoing method embodiments may be implemented by a program instructing relevant hardware. The aforementioned program may be stored in a computer-readable storage medium. During execution of the program, the steps of the foregoing method embodiments are performed; and the aforementioned storage medium includes various media that can store program code, such as a ROM, a RAM, a magnetic disk, or an optical disc.

Finally, it should be noted that the foregoing embodiments are merely used for describing the technical solutions of the present disclosure, but are not intended to limit the present disclosure. Although the present disclosure is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the present invention.

What is claimed is:

1. A remote automobile diagnostic method applied to a server, comprising:
   receiving a diagnosis joining request sent by a remote terminal, and adding the remote terminal to a diagnostician group;
   sending, to the remote terminal in the diagnostician group, diagnostic information uploaded by a diagnostic device; and
   determining, as a control terminal, a remote terminal with control permission in the diagnostician group, so that the control terminal controls, according to the diagnostic information, the diagnostic device to perform an automobile diagnosis operation.

2. The method according to claim 1, wherein before the receiving a diagnosis joining request sent by a remote terminal, the method further comprises:
   initiating the diagnosis invitation to at least one remote terminal.

3. The method according to claim 1, wherein after the sending, to the remote terminal in the diagnostician group, diagnostic information uploaded by the diagnostic device, the method further comprises:
   receiving a diagnostic information adjustment request sent by the remote terminal;
   adjusting the diagnostic information associated with the remote terminal according to the diagnostic information adjustment request; and
   sending adjusted diagnostic information to the remote terminal.

4. The method according to claim 3, wherein the diagnostic information adjustment request is used to request to adjust at least one piece of information in the diagnostic information; and
   the adjusting the diagnostic information associated with the remote terminal according to the diagnostic information adjustment request comprises:
   adjusting the at least one piece of information in the diagnostic information associated with the remote terminal according to the diagnostic information adjustment request.

5. The method according to claim 1, wherein the determining, as a the control terminal, the remote control with control permission in the diagnostician group comprises:
   receiving a control request sent by the remote terminal in the diagnostician group, and determining at least one remote terminal to have the control permission according to a sequence of receiving the control request; or
   selecting at least one remote terminal to have the control permission from remote terminals in the diagnostician group that meet a preset condition.

6. The method according to claim 1, wherein after a diagnostician group is established for all joined remote terminals, the method further comprises:
   receiving a quit request sent by the remote terminal in the diagnostician group; and
   if it is determined that the remote terminal does not have the control permission, feeding quit agreement information back to the remote terminal, and deleting the remote terminal from the diagnostician group; or
   if it is determined that the remote terminal has the control permission, revoking the control permission of the remote terminal, feeding the quit agreement information back to the remote terminal, and deleting the remote terminal from the diagnostician group.

7. The method according to claim 1, further comprising:
   receiving a sharing request of the remote terminal in the diagnostician group, and sharing a display interface of the remote terminal that sends the sharing request with other remote terminals in the diagnostician group in real time.

8. The method according to claim 1, further comprising:
   receiving an invitation request of the remote terminal in the diagnostician group, the invitation request including information about a target remote terminal, and the target remote terminal referring to a remote terminal that is invited but not within the diagnostician group;
   forwarding the invitation request to the target remote terminal; and
   after an agreement message of the target remote terminal is received, adding the target remote terminal to the diagnostician group.

9. A remote automobile diagnostic method applied to a remote terminal, comprising:
   sending a diagnosis joining request to a server, so that the server adds the remote terminal to a diagnostician group;
   receiving diagnostic information sent by the server, wherein the diagnostic information is uploaded by a diagnostic device; and
   if the server determines the remote terminal as a remote control with control permission using the remote terminal as a control terminal, controlling, according to the diagnostic information, the diagnostic device to perform an automobile diagnosis operation.

10. A remote automobile diagnostic method applied to a diagnostic device, comprising:
    sending diagnostic information to a server, so that the server sends the diagnostic information to a remote terminal in a diagnostician group; and
    performing an automobile diagnosis operation under control of a remote terminal with control permission in the diagnostician group.

11. A remote automobile diagnostic apparatus, comprising:
    a processing module configured to: receive a diagnosis joining request sent by a remote terminal, and add the remote terminal to a diagnostician group;

a sending module configured to send, to the remote terminal in the diagnostician group, diagnostic information uploaded by a diagnostic device; and a determining module configured to determine, as a control terminal, a remote terminal with control permission in the diagnostician group, so that the control terminal controls, according to the diagnostic information, the diagnostic device to perform an automobile diagnosis operation.

12. The apparatus according to claim 11, wherein the sending module is further configured to initiate a diagnosis invitation to at least one remote terminal before the diagnosis joining request sent by the remote terminal is received.

13. The apparatus according to claim 11, wherein the processing module is further configured to: after the diagnostic information uploaded by a diagnostic device is sent to the remote terminal in the diagnostician group, receive a diagnostic information adjustment request sent by the remote terminal, and adjust diagnostic information associated with the remote terminal according to the diagnostic information adjustment request; and the sending module is further configured to send adjusted diagnostic information to the remote terminal.

14. The apparatus according to claim 13, wherein the diagnostic information adjustment request is used to request to adjust at least one piece of information in the diagnostic information; and the adjusting the diagnostic information associated with the remote terminal according to the diagnostic information adjustment request comprises:

adjusting the at least one piece of information in the diagnostic information associated with the remote terminal according to the diagnostic information adjustment request.

15. The apparatus according to claim 11, wherein the determining module is specifically configured to:

receive a control request sent by the remote terminal in the diagnostician group, and determine at least one remote terminal to have the control permission according to a sequence of receiving the control request; or select at least one remote terminal to have the control permission from remote terminals in the diagnostician group that meet a preset condition.

16. The apparatus according to claim 11, wherein the processing module is further configured to receive a quit request sent by the remote terminal in the diagnostician group after a diagnostician group is established for all joined remote terminals; and if it is determined that the remote terminal does not have the control permission, feed quit agreement information back to the remote terminal, and delete the remote terminal from the diagnostician group; or if it is determined that the remote terminal has the control permission, revoke the control permission of the remote terminal, feed the quit agreement information back to the remote terminal, and delete the remote terminal from the diagnostician group.

17. The apparatus according to claim 11, wherein the processing module is further configured to:

receive a sharing request of the remote terminal in the diagnostician group, and share a display interface of the remote terminal that sends the sharing request with other remote terminals in the diagnostician group in real time.

18. The apparatus according to claim 11, wherein the processing module is further configured to:

receive an invitation request of the remote terminal in the diagnostician group, the invitation request including information about a target remote terminal, and the target remote terminal referring to a remote terminal that is invited but not within the diagnostician group;

forward the invitation request to the target remote terminal; and after an agreement message of the target remote terminal is received, add the target remote terminal to the diagnostician group.

19. A remote automobile diagnostic system, comprising a server, a remote terminal, and a diagnostic device; wherein the server is respectively connected to the remote terminal and the diagnostic device;

the server is configured to receive a diagnosis joining request sent by a remote terminal, and add the remote terminal to a diagnostician group; send, to the remote terminal in the diagnostician group, diagnostic information uploaded by a diagnostic device; and determine, as a control terminal, a remote terminal with control permission in the diagnostician group, so that the control terminal controls, according to the diagnostic information, the diagnostic device to perform an automobile diagnosis operation;

the remote terminal is configured to send a diagnosis joining request to the server, so that the server adds the remote terminal to a diagnostician group; receive diagnostic information sent by the server, wherein the diagnostic information is uploaded by the diagnostic device; and if the server determines the remote terminal as a remote control with control permission using the remote terminal as a control terminal, control, according to the diagnostic information, the diagnostic device to perform an automobile diagnosis operation; and the diagnostic device is configured to send diagnostic information to a server, so that the server sends the diagnostic information to a remote terminal in a diagnostician group; and perform an automobile diagnosis operation under control of a remote terminal with control permission in the diagnostician group.

* * * * *